United States Patent
Guo et al.

(10) Patent No.: US 11,624,458 B2
(45) Date of Patent: Apr. 11, 2023

(54) EXPLOSION-PROOF FLEXIBLE METAL HOSE FOR NATURAL GAS PIPELINES

(71) Applicant: LANZHOU TIANYI PETROCHEMICAL EQUIPMENT MAINTENANCE TECHNOLOGY CO. LTD, Lanzhou (CN)

(72) Inventors: Jingyi Guo, Lanzhou (CN); Kai Liu, Lanzhou (CN); Linlin He, Lanzhou (CN); Ronggang Liu, Lanzhou (CN); Hufeng Xia, Lanzhou (CN); Lei Zhang, Lanzhou (CN)

(73) Assignee: LANZHOU TIANYI PETROCHEMICAL EQUIPMENT MAINTENANCE TECHNOLOGY CO. LTD, Lanzhou (CN)

( * ) Notice: Subject to any disclaimer, the term of this patent is extended or adjusted under 35 U.S.C. 154(b) by 0 days.

(21) Appl. No.: 17/466,485

(22) Filed: Sep. 3, 2021

(65) Prior Publication Data
US 2022/0136623 A1 May 5, 2022

(30) Foreign Application Priority Data
Sep. 7, 2020 (CN) .......................... 202010930166.9

(51) Int. Cl.
*F16L 11/16* (2006.01)
(52) U.S. Cl.
CPC .................................... *F16L 11/16* (2013.01)
(58) Field of Classification Search
CPC ...................................................... F16L 11/16

USPC .......................................................... 285/903
See application file for complete search history.

(56) References Cited

U.S. PATENT DOCUMENTS

| | | | | |
|---|---|---|---|---|
| 3,086,556 | A * | 4/1963 | Kanter | F16L 11/16 138/131 |
| 3,251,612 | A * | 5/1966 | Webbe | F16L 33/01 285/55 |
| 7,690,693 | B2 * | 4/2010 | Moner | F16L 25/0036 285/903 |
| 2004/0212191 | A1 * | 10/2004 | Segal | F16L 19/0286 285/903 |
| 2006/0244259 | A1 * | 11/2006 | Saito | F16L 25/0036 285/903 |
| 2008/0110518 | A1 * | 5/2008 | Hamilton | F16L 33/24 138/135 |
| 2010/0154915 | A1 * | 6/2010 | Wu | E03C 1/0408 138/135 |

(Continued)

*Primary Examiner* — Craig M Schneider
*Assistant Examiner* — David R Deal
(74) *Attorney, Agent, or Firm* — Fish IP Law, LLP

(57) ABSTRACT

The field of metal hoses, and specifically, an explosion-proof flexible metal hose for natural gas pipelines is concerned. The problems that the existing metal hose has low intensity and high flow velocity are solved. The explosion-proof flexible metal hose for natural gas pipelines includes a metal hose. A side of the metal hose is provided with a fixing assembly composed of a flange and a loose flange, and an other side of the metal hose is provided with a welding neck flange configured for fixing. The metal hose is covered with a steel band with a multilayer structure. The metal hose and two ends of the steel band are fixed through cooperation between metal short sections and pressing clamp rings. A reinforcement coil is wound around the metal hose.

4 Claims, 7 Drawing Sheets

(56) References Cited

U.S. PATENT DOCUMENTS

2011/0297267 A1* 12/2011 Jung ................. F16L 19/028
 138/120
2014/0014218 A1* 1/2014 Gudme ................ F16L 11/00
 138/137

* cited by examiner

A Partial

---- Bottom layer
— — Middle layer
——— Surface layer

Existing art

This solution

EXPLOSION-PROOF FLEXIBLE METAL HOSE FOR NATURAL GAS PIPELINES

CROSS REFERENCE TO RELATED APPLICATION

This application claims the benefit and priority of Chinese patent application no. 202010930166.9 entitled "explosion-proof flexible metal hose for natural gas pipelines" filed with the Chinese patent office on Sep. 7, 2020, which is incorporated herein by reference in its entirety.

TECHNICAL FIELD

The present disclosure relates to the field of flexible metal hoses, and specifically relates to an explosion-proof flexible metal hose for natural gas pipelines.

BACKGROUND ART

In the natural gas transportation and petrochemical industries, the most commonly used machine is a reciprocating compressor. Most of pipelines are subjected to alternating loads and are in a high-pressure state in a working process. Many flash explosion and fire accidents which are caused by static electricity formed by high-pressure natural gas or gas in a pipeline leakage process had occurred in the field of domestic oil and gas fields, resulting in heavy human casualties and resource losses. Furthermore, accidents and events of hydrogen sulfide poisoning caused by natural gas leakage (blowout) also occur occasionally in the oil and gas industry at home and abroad.

By use of a metal hose, an axial extension and a radial offset of pipelines are better compensated, and a buffer effect is also achieved, so that damage of the alternating loads is reduced. However, an ordinary metal hose has relatively low intensity and relatively low high-pressure resistance, so that the metal hose has a tendency of burst and leakage, causing heavy losses to enterprises. Since the metal hose is a weak link in a natural gas compression and transportation pipeline network system, once high-pressure combustible gas leaks, the high-pressure natural gas frictionizes with a nozzle due to high flow velocity and easily generates electrostatic sparks and electrostatic flash explosion. Furthermore, the natural gas in a gas field contains hydrogen sulfide, chloride ions and other minerals. Leakage of the natural gas containing these harmful components can also cause harm to surrounding people and animals or pollution to the environment, so that the potential safety risks are great.

SUMMARY

The present disclosure provides an explosion-proof flexible metal hose for natural gas pipelines, and aims to solve the problems that an existing metal hose has low intensity and high flow velocity.

In order to achieve the foregoing purpose, the present disclosure adopts the following technical solution.

An explosion-proof flexible metal hose for natural gas pipelines includes a metal hose 5. A side of the metal hose 5 is provided with a fixing assembly composed of a flange 1 and a loose flange 2, and an other side of the metal hose 5 is provided with a welding neck flange 9 configured for fixing. The metal hose 5 is coverd with a steel band 7 with a multilayer structure. Two ends of the metal hose 5 and two ends of the steel band 7 are fixed through cooperation between metal short sections 3 and pressing clamp rings 4. And a reinforcement coil 6 is wound around the metal hose 5.

Two ends of the metal hose 5 may be connected with the metal short sections 3 by end rings 8.

The metal hose 5 may adopt a corrugated pipe structure.

The flange 1 and the welding neck flange 9 may be respectively fixed with two ends of the metal short sections 3 by first welded junctions 10 which adopt Y-shaped welded joints.

The pressing clamp rings 4 may be fixed with the metal short sections 3 by second welded junctions 11 which adopt fillet welded joints Two ends of the steel band 7 may be fixedly embedded between the metal short sections 3 and the pressing clamp rings 4.

The reinforcement coil 6 may be wound at a wave trough of the corrugated pipe of the metal hose 5.

The structure of the steel band 7 may include three or more layers, and adjacent layers of the three or more layers are in contact in a dislocation manner.

The embodiments have the beneficial effects. 1. The existing metal hose structure is optimized through technical improvement. The reinforcement coil is designed in the metal hose, so that the intensity of the metal hose is improved. A dual anti-explosion effect of the metal hose is achieved, the accident occurrence is reduced, and the service life is prolonged.

The structure that the steel band is coiled on the existing metal hose is optimized. Adjacent layers of the steel band coiled on an outer layer of the corrugated pipe are in contact in the dislocation manner due to changes of a coiling order. For the metal steel band in dislocation contact, each upper layer covers a clearance of a next layer of steel band, which is covered layer by layer in turn, so that an outflow path of leaking gas is changed from a linear type to multiple winding types to achieve the effect of multi-stage pressure reduction, reduce the natural gas leakage rate sequentially until it is close to zero, thereby suppressing generation of friction static electricity.

Figure 1:
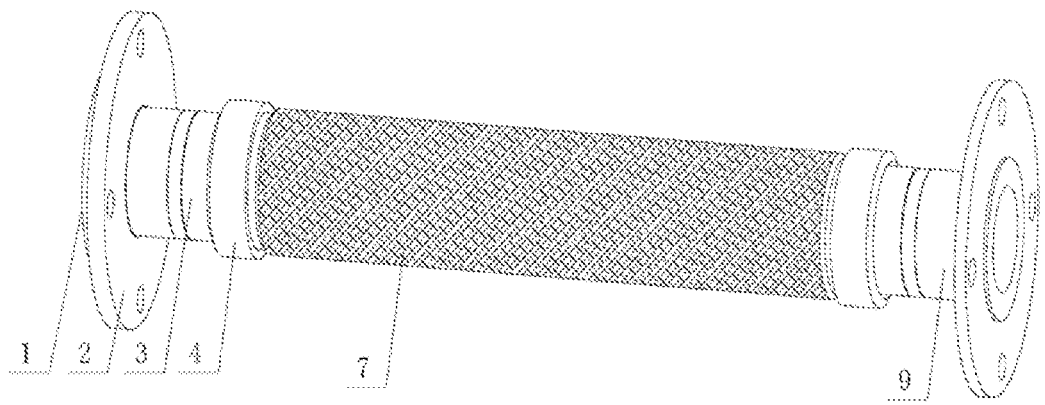
FIG. 1 is a schematic structural diagram of the present disclosure.

List of the reference characters: 1 small flange; 2 loose flange; 3 metal short section; 4 pressing clamp ring; 5 metal hose; 6 reinforcement coil; 7 steel band; 8 end ring; 9 welding neck flange; 10 first welded junction; and 11 second welded junction.

DETAILED DESCRIPTION OF THE EMBODIMENTS

The technical solution of the present disclosure is further described below in combination with the accompanying drawings and specific embodiments.

A specific installation structure of an explosion-proof flexible metal hose for natural gas pipelines as shown in FIGS. 1-9 is as follows.

Figure 2:
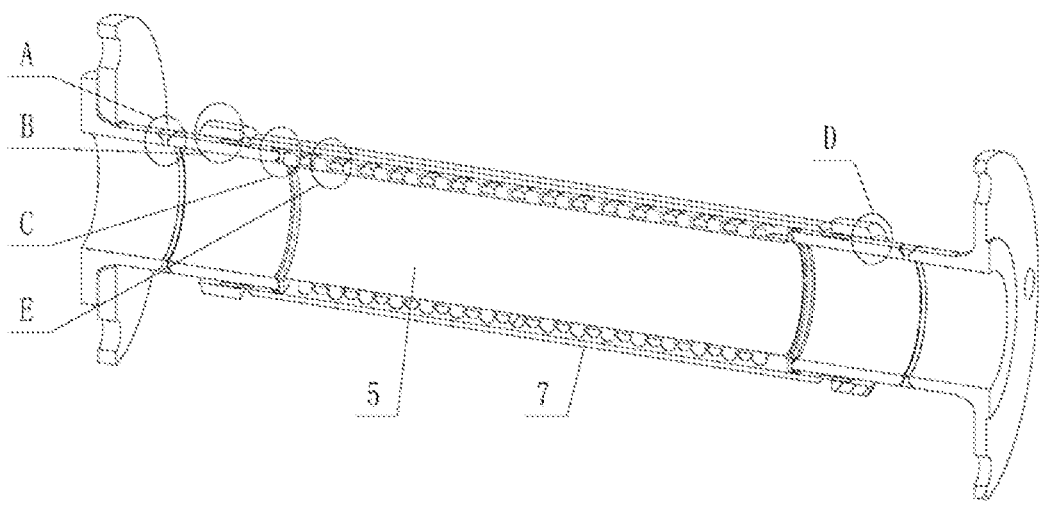
FIG. 2 is a sectional view of the present disclosure.
Figure 5:
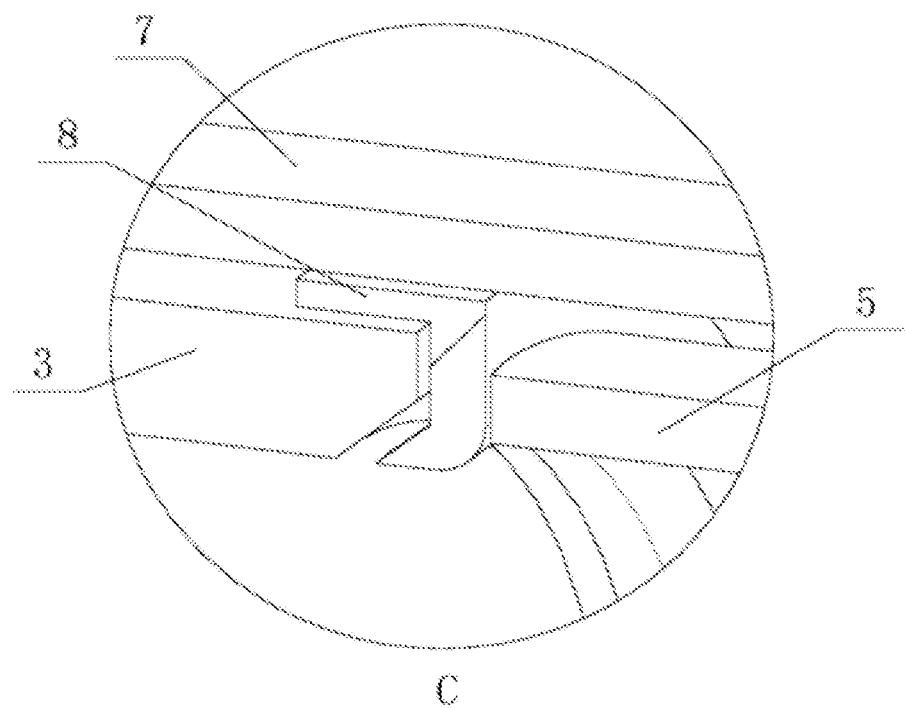
FIG. 5 is an enlarged diagram of a portion C in FIG. 2.

As shown in FIG. 1 and FIG. 2, the device takes a metal hose 5 as a base. A steel band 7 is wrapped on an outer surface of the metal hose 5. Two ends of the metal hose 5 are provided with metal short sections 3 with barrel-shaped structures. In order to realize contact stability between the metal short sections 3 and the metal hose 5, end rings 8 are arranged between the metal short sections 3 and the metal hose 5, as shown in FIG. 5.

Figure 3:
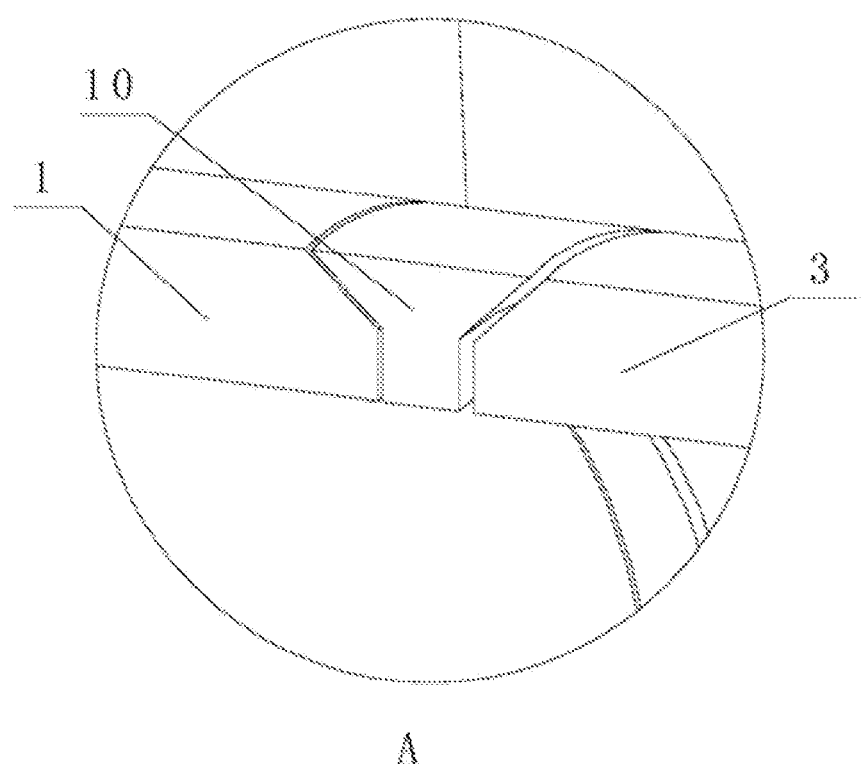
FIG. 3 is an enlarged diagram of a portion A in FIG. 2.
Figure 4:
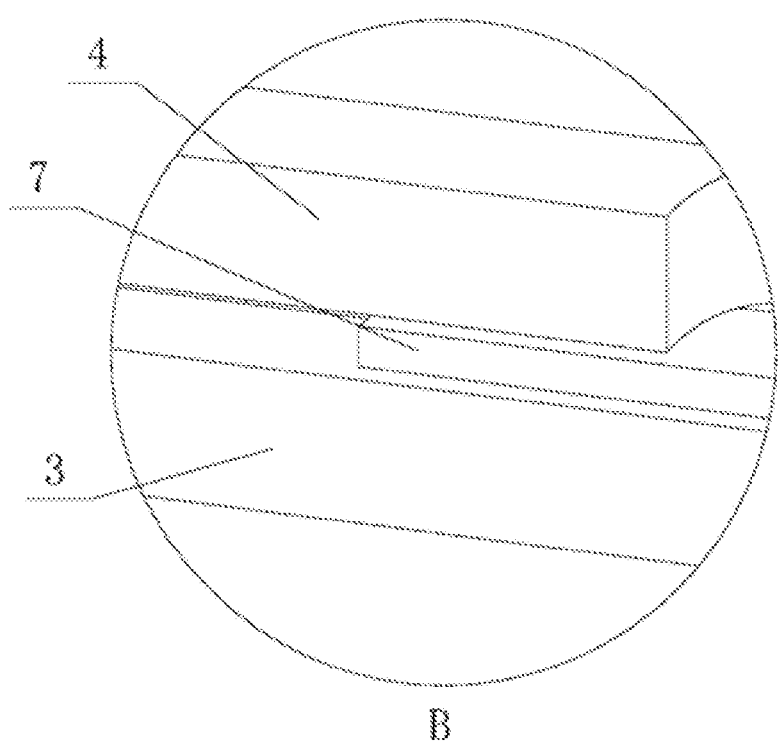
FIG. 4 is an enlarged diagram of a portion B in FIG. 2.
Figure 6:
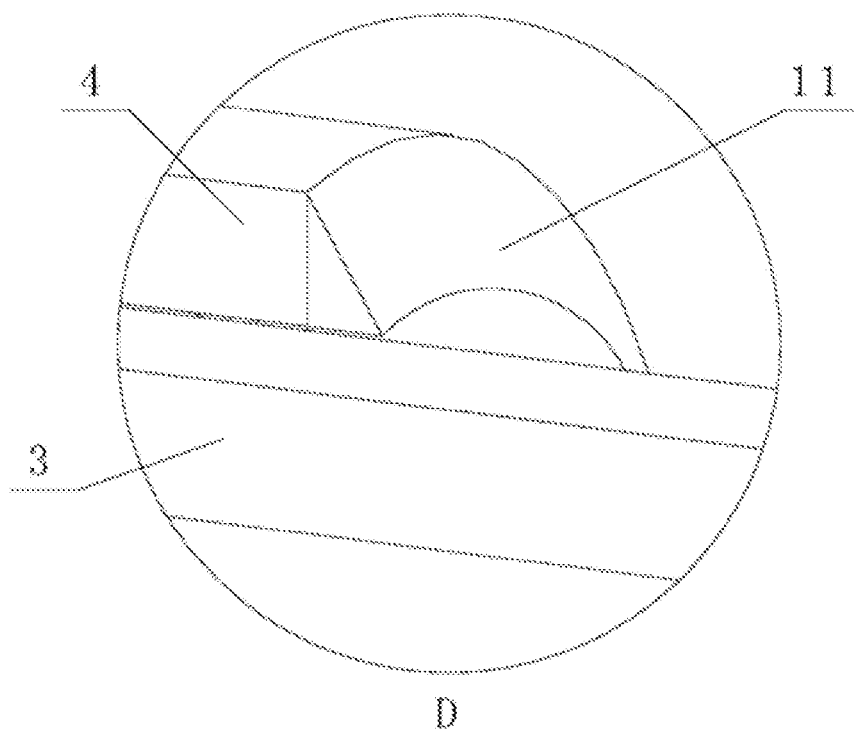
FIG. 6 is an enlarged diagram of a portion D in FIG. 2.

In order to keep the metal short sections 3, the metal hose 5 and the steel band 7 stable, pressing clamp rings 4 are adopted. An installation structure is as shown in FIG. 3. The pressing clamp rings 4 are fixedly welded with the metal short sections 3, with welded junctions which are second welded junctions 11. The welded junctions adopt fillet welded joints according to an on-site welding situation, as shown in FIG. 6. Before the metal short sections 3 and the pressing clamp rings 4 are welded, ends of the steel band 7 are arranged between the metal short sections 3 and the pressing clamp rings 4 to guarantee the stability of the steel band 7 after the welding, so that the metal short sections 3, the pressing clamp rings 4, the metal hose 5 and the steel band 7 form a stable whole.

After the whole is formed, the whole is needed to be installed and fixed, as shown in FIG. 1. A left end of the whole adopts an installation end of a combined structure composed of a small flange 1 and a loose flange 2, and a right end of the whole adopts an installation end of a welding neck flange 9. The whole is fixed through a bolt structure.

Two metal short sections 3 are welded with the small flange 1 and the welding neck flange 9 by first welded junctions 10. The welded junction adopts a Y-shaped welded joint.

Embodiment I

An explosion-proof flexible metal hose for natural gas pipelines as shown in FIGS. 1-9 aims to solve the problem that friction easily occurs between the leaking natural gas and a nozzle due to high flow velocity and generates electrostatic sparks and electrostatic flash explosion. In order to solve the above problem, the device adopts different designs of a steel band 7. Specific installation is as follows.

As shown in FIG. 1 and FIG. 2, the device takes a metal hose 5 as a base. The steel band 7 is wrapped on an outer surface of the metal hose 5. Two ends of the metal hose 5 are provided with metal short sections 3 with barrel-shaped structures. In order to realize contact stability between the metal short sections 3 and the metal hose 5, end rings 8 are arranged between the metal short sections 3 and the metal hose 5, as shown in FIG. 5.

In order to keep the metal short sections 3, the metal hose 5 and the steel band 7 stable, pressing clamp rings 4 are adopted. An installation structure is as shown in FIG. 3. The pressing clamp rings 4 and the metal short sections 3 are fixedly welded by welded junctions which are second welded junctions 11. This welded junction adopts a fillet welded joint according to an on-site welding situation, as shown in FIG. 6. Before the metal short sections 3 and the pressing clamp rings 4 are welded, ends of the steel band 7 are arranged between the metal short sections 3 and the pressing clamp rings 4 to guarantee the stability of the steel band 7 after the welding, so that the metal short sections 3, the pressing clamp rings 4, the metal hose 5 and the steel band 7 form a stable whole.

Figure 8:
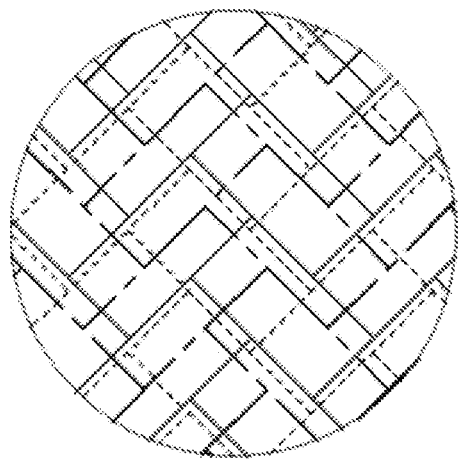
FIG. 8 is a schematic structural diagram of a steel band.
Figure 9:
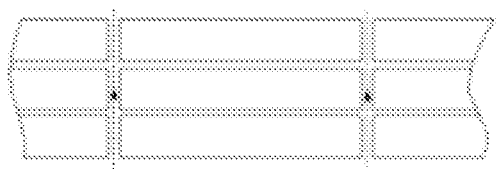
FIG. 9 is a comparison diagram of an existing steel band and a traditional steel band.
Figure 9:
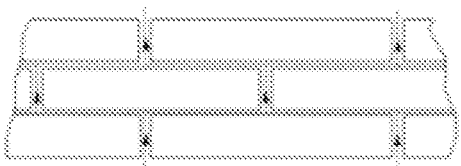

In the whole, the steel band 7 is in a stacked design, including three or more layers. In the present embodiment, a three-layer structure is adopted. As shown in FIG. 8, the three-layer structure is divided into a bottom layer, a middle layer and a surface layer. Gaps between the three layers are dislocated to achieve effects of preventing explosion and buffering leakage. The buffer effect is as shown in FIG. 9.

After the whole is formed, the whole is needed to be installed and fixed, as shown in FIG. 1. A left end of the whole adopts an installation end of a combined structure composed of a small flange 1 and a loose flange 2, and a right end of the whole adopts an installation end of a welding neck flange 9. The whole is fixed through a bolt structure.

Two metal short sections 3 are welded with the small flange 1 and the welding neck flange 9 by first welded junctions 10. The welded junction adopts a Y-shaped welded joint.

Embodiment II

An explosion-proof flexible metal hose for natural gas pipelines as shown in FIGS. 1-9 aims to solve the problem that an ordinary metal hose has a tendency of burst and leakage due to relatively low intensity and relatively low high-pressure resistance. In order to solve the above problem, the device adopts an additional design of the reinforcement coil 6. Specific installation is as follows.

An explosion-proof flexible metal hose for natural gas pipelines as shown in FIGS. 1-9 aims to solve the problem that the friction easily occurs between the leaking natural gas and a nozzle due to high flow velocity and generates electrostatic sparks and electrostatic flash explosion. In order to solve the above problem, the device adopts different designs of a steel band 7. Specific installation is as follows.

As shown in FIG. 1 and FIG. 2, the device takes a metal hose 5 as a base. The steel band 7 is wrapped on an outer surface of the metal hose 5. Two ends of the metal hose 5 are provided with metal short sections 3 with barrel-shaped structures. In order to realize contact stability between the metal short sections 3 and the metal hose 5, end rings 8 are arranged between the metal short sections 3 and the metal hose 5, as shown in FIG. 5.

Figure 7:
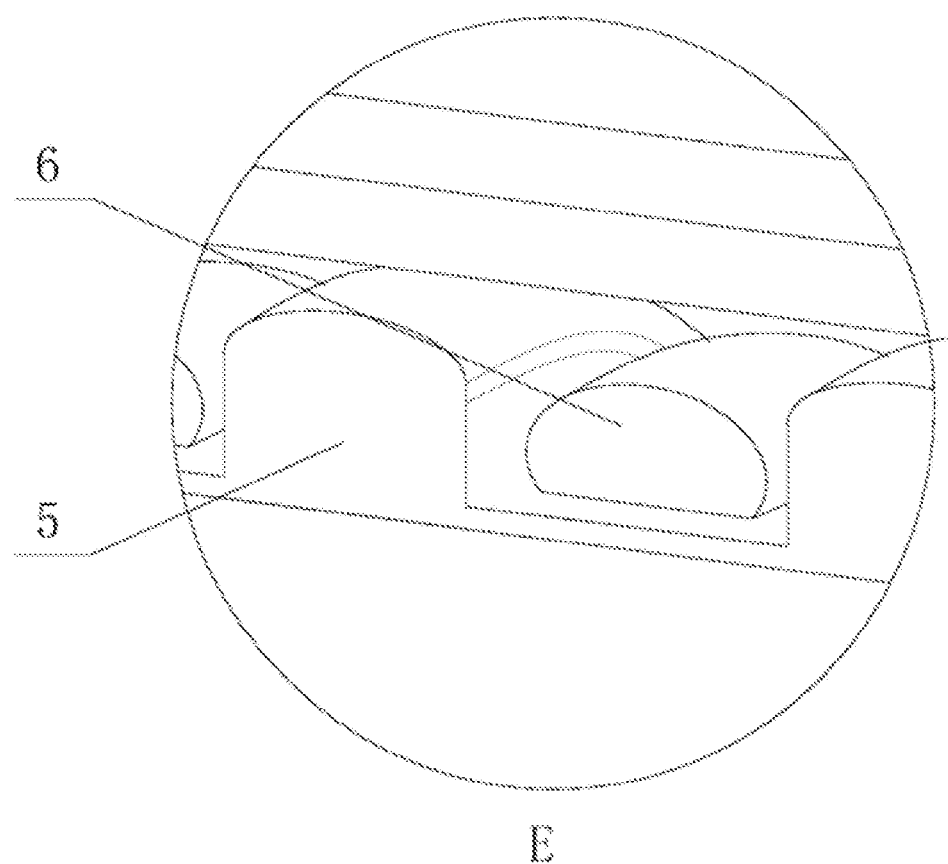
FIG. 7 is an enlarged diagram of a portion E in FIG. 2.

In order to obtain the metal hose 5 of high intensity and high pressure bearing performance, the metal hose 5 adopts a spiral corrugated pipe structure. The specific structure is as shown in FIG. 7. The reinforcement coil 6 is coiled on the metal hose 5 of the spiral corrugated pipe structure. A gap is reserved between the reinforcement coil 6 and the metal hose 5 to realize telescopic compensation. The reinforcement coil 6 adopts a stainless steel material, so that a dual anti-explosion effect can be achieved on the metal hose, and the intensity of the metal hose 5 is enhanced.

In order to keep the metal short sections 3, the metal hose 5 and the steel band 7 stable, pressing clamp rings 4 are adopted. An installation structure is as shown in FIG. 3. The pressing clamp rings 4 and the metal short sections 3 are fixedly welded by welded junctions which are second welded junctions 11. This welded junction adopts a fillet welded joint according to an on-site welding situation, as shown in FIG. 6. Before the metal short sections 3 and the pressing clamp rings 4 are welded, ends of the steel band 7 are arranged between the metal short sections 3 and the pressing clamp rings 4 to guarantee the stability of the steel band 7 after the welding, so that the metal short sections 3, the pressing clamp rings 4, the metal hose 5 and the steel band 7 form a stable whole.

After the whole is formed, the whole is needed to be installed and fixed, as shown in FIG. 1. A left end of the whole adopts an installation end of a combined structure of a small flange 1 and a loose flange 2, and a right end of the whole adopts an installation end of a welding neck flange 9. The whole is fixed through a bolt structure.

Two metal short sections 3 are welded with the small flange 1 and the welding neck flange 9 by first welded junctions 10. The welded junction adopts a Y-shaped welded joint.

For those skilled in the art, it is apparent that the present disclosure is not limited to the details of the demonstrative embodiments mentioned above, and that the present disclosure can be realized in other specific forms without departing from the spirit or basic features of the present disclosure. Therefore, from any point of view, the embodiments should be regarded as exemplary and non-limiting. The scope of the present disclosure is defined by the appended claims rather than the above description. Therefore, all changes falling within the meanings and scope of equivalent elements of the claims are intended to be included in the present disclosure. No drawing markings in claims shall be deemed to limit the claims involved.

In addition, it should be understood that although the present specification is described in accordance with the embodiments, and each embodiment does not only contain one independent technical solution. This narration in the specification is only for clarity. Those skilled in the art should regard the specification as a whole. The technical solutions in all the embodiments can also be appropriately combined to form other implementation modes that can be understood by those skilled in the art.

What is claimed is:

1. An explosion-proof flexible metal hose for natural gas pipelines, comprising a metal hose, wherein a side of the metal hose is provided with a fixing assembly composed of a flange and a loose flange, and an other side of the metal hose is provided with a welding neck flange configured for fixing, the metal hose is covered with a steel band with a multilayer structure, two ends of the metal hose and two ends of the steel band are fixed through cooperation between metal short sections and pressing clamp rings; and a reinforcement coil is wound around the metal hose; the two ends of the metal hose are connected with the metal short sections by end rings; wherein the metal hose adopts a structure of a corrugated pipe, and the reinforcement coil is wound at a wave trough of the corrugated pipe.

2. The explosion-proof flexible metal hose for natural gas pipelines according to claim 1, wherein the flange and the welding neck flange are respectively fixed with two ends of the metal short sections by first welded junctions which adopt Y-shaped welded joints.

3. The explosion-proof flexible metal hose for natural gas pipelines according to claim 1, wherein the pressing clamp rings are fixed with the metal short sections by second welded junctions which adopt fillet welded joints.

4. The explosion-proof flexible metal hose for natural gas pipelines according to claim 1, wherein the two ends of the steel band are fixedly embedded between the metal short sections and the pressing clamp rings.

\* \* \* \* \*